United States Patent
Bowles et al.

(10) Patent No.: US 7,579,809 B2
(45) Date of Patent: Aug. 25, 2009

(54) RECHARGEABLE WIRELESS ADAPTERS

(75) Inventors: Mark V. Bowles, San Diego, CA (US); Jarvis C. Tou, San Diego, CA (US)

(73) Assignee: Staccato Communications, Inc., San Diego, CA (US)

( * ) Notice: Subject to any disclaimer, the term of this patent is extended or adjusted under 35 U.S.C. 154(b) by 0 days.

(21) Appl. No.: 11/491,478

(22) Filed: Jul. 21, 2006

(65) Prior Publication Data

US 2007/0032098 A1    Feb. 8, 2007

Related U.S. Application Data

(60) Provisional application No. 60/705,725, filed on Aug. 4, 2005, provisional application No. 60/776,797, filed on Feb. 24, 2006.

(51) Int. Cl.
*H02J 7/00* (2006.01)

(52) U.S. Cl. .............. 320/107; 320/112; 320/114; 710/313

(58) Field of Classification Search .......... 320/107, 320/108, 112, 114, 137; 710/313
See application file for complete search history.

(56) References Cited

U.S. PATENT DOCUMENTS

| | | | |
|---|---|---|---|
| 5,241,542 A | 8/1993 | Natarajan et al. | |
| 6,761,561 B2 | 7/2004 | Mandelkern et al. | |
| 6,801,967 B2 | 10/2004 | Nakamura et al. | |
| 6,832,281 B2 | 12/2004 | Jones et al. | |
| 6,941,114 B1 * | 9/2005 | Kuo et al. | 455/74 |
| 2002/0141385 A1 | 10/2002 | Wasik et al. | |
| 2004/0090924 A1 | 5/2004 | Giaimo et al. | |
| 2004/0150615 A1 * | 8/2004 | Lee | 345/156 |
| 2004/0204074 A1 * | 10/2004 | Desai | 455/557 |
| 2005/0001592 A1 * | 1/2005 | Bayne et al. | 320/132 |
| 2005/0086413 A1 * | 4/2005 | Lee et al. | 710/313 |
| 2005/0120146 A1 * | 6/2005 | Chen et al. | 710/22 |
| 2005/0289631 A1 * | 12/2005 | Shoemake | 725/118 |
| 2006/0069840 A1 * | 3/2006 | Corbett et al. | 710/313 |
| 2006/0202660 A1 * | 9/2006 | Chang | 320/115 |
| 2007/0072474 A1 * | 3/2007 | Beasley et al. | 439/332 |

OTHER PUBLICATIONS

ExpressCard, ExpressCard Technology from PCMCIA, www.expresscard.org.

* cited by examiner

*Primary Examiner*—Akm E Ullah
*Assistant Examiner*—Ramy Ramadan
(74) *Attorney, Agent, or Firm*—Van Pelt, Yi & James LLP

(57) ABSTRACT

Charging a battery is disclosed. An electrical connection is formed between a wireless adapter having a battery and a host. The wireless adapter is configured to be able to be removably coupled to a device to provide a wireless channel between the device and the host. The battery of the wireless adapter is charged using the host.

23 Claims, 9 Drawing Sheets

RECHARGEABLE WIRELESS ADAPTERS

CROSS REFERENCE TO OTHER APPLICATIONS

This application claims priority to U.S. Provisional Patent Application No. 60/705,725 entitled RECHARGEABLE WIRELESS USB ADAPTORS filed Aug. 4, 2005 and priority to U.S. Provisional Patent Application No. 60/776,797 entitled WIRELESS ADAPTERS FOR LEGACY SYSTEMS WITH FLASH MEMORY filed Feb. 24, 2006, which are incorporated herein by reference for all purposes.

BACKGROUND OF THE INVENTION

Universal Serial Bus (USB) systems are commonly used and allow a user to connect two systems without requiring a user to download a new driver. For example, a user can easily and conveniently transfer photographs from a digital camera to a laptop using a USB cable. Wireless adapters are being developed that enable legacy systems to exchange data over a wireless channel rather than using a USB cable. However, powering a wireless adapter may be an issue since legacy USB systems are designed to use a USB cable. Techniques to address power supply issues for wireless adapters may make wireless adapters more convenient to use.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various aspects of charging a wireless adapter are disclosed. A first wireless adapter that has a battery is obtained. The first wireless adapter is configured to be able to be removably coupled to a device to provide a wireless channel between the device and a host. For example, in some embodiments, a device does not have built-in wireless capabilities and the first wireless device is coupled to the device (e.g., via a USB type B connection or an ExpressCard slot) to provide a wireless channel. The first and second wireless adapters are coupled. The battery of the first wireless adapter is charged via the second wireless adapter. In some embodiments, the first wireless adapter is not coupled to the device while being charged. In some embodiments, the connection via which charging occurs is the same connection via which the first wireless adapter is coupled to the device. For example, in some embodiments the first wireless adapter has a plug and first wireless adapter may be inserted into either the device (to provide a wireless channel) or the second wireless adapter (to be charged).

Figure 1A:
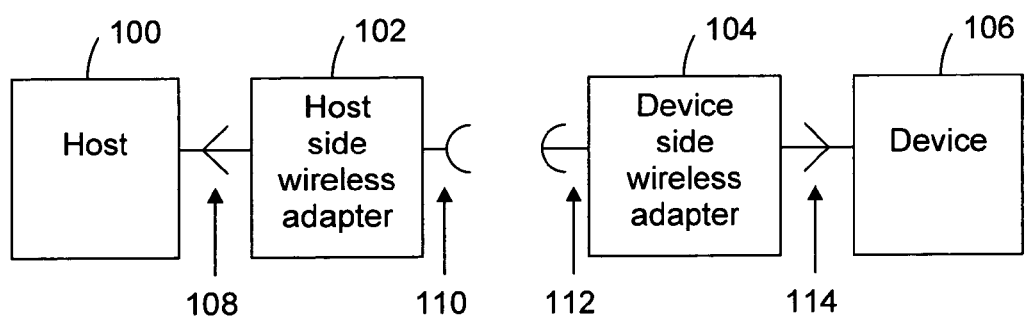
FIG. 1A is a system diagram illustrating an embodiment of a host side wireless adapter and a device side wireless adapter used to provide a wireless channel.

FIG. 1A is a system diagram illustrating an embodiment of a host side wireless adapter and a device side wireless adapter used to provide a wireless channel. In the example shown, host 100 and device 106 are legacy systems. A legacy system is defined to be a system that does not have built-in wireless capabilities. A cable (not shown) can be used to connect host 100 and device 106 and provide a wired connection via which host 100 and device 106 exchange data. In some embodiments, a host is a computer, a Personal Digital Assistant (PDA), a mobile phone, or a game console. In some embodiments, a device is a peripheral device used with a host. Some examples of devices are cameras, printers, mice, keyboards, joysticks, external storage devices, and scanners.

Host 100 and device 106 each have at least one connector. A connector is an electromechanical interface via which two systems may be coupled together. Coupling includes removably coupling, where systems are able to be coupled and decoupled any number of times without deforming or destroying a connector. In this example, host 100 and device 106 have Universal Serial Bus (USB) connectors. In some cases, a USB connector is either a USB port (i.e., a female connector) or a USB plug (i.e., a male connector). Host 100 and device 106 have USB ports and wireless adapters 102 and 104 have USB plugs. Connection 108 is formed by inserting the USB plug of host side wireless adapter 102 into the USB port of host 100. Similarly, connection 114 is formed inserting the USB plug of device side wireless adapter 104 into the USB port of device 106. Connections may be formed and broken any number of times without requiring host 100 or device 106 to restart or power down.

With connections 108 and 114 formed, host 100 and device 106 may be able to communicate via a wireless channel. Host side wireless adapter 102 and device side wireless adapter 104 may include transceivers capable of exchanging data over a wireless channel. For example, data may be passed from host 100 to host side wireless adapter 102 via connection 108. Host side wireless adapter 102 wirelessly transmits a signal which is received by device side wireless adapter 104. Received data is passed from device side wireless adapter 104 to device 106 via connection 114. Data wirelessly exchanged in the other direction follows the reverse path. In some cases, it may not be necessary for new drivers or other software to be installed on device 106. For example, USB drivers associated with legacy communication via a cable may be sufficient to support wireless communication as described. In some cases, a new driver is installed on host 100 and/or device 106.

In some embodiments, a wideband or ultra wideband (UWB) wireless channel is used. A variety of standard and specification associated with UWB may be used, including the WiMedia UWB specification in some embodiments. In some embodiments, a narrowband wireless channel is used, such as the narrowband wireless systems described by the IEEE 802.11 (WiFi) specification or the IEEE 802.16 WiMAX specification. Any appropriate wireless channel may be used.

Connections 108 and 114 and the connectors associated with them are illustrated using schematic representations. A connector may conform to a specification regarding size, form, and/or signaling. For example, a variety of USB connectors may be used, including standard A, standard B, mini A, and mini B. Each type of USB connector may have a defined mechanical interface and a defined electrical interface described in a USB specification or the On the Go Supplement. In some embodiments, connections 108 and 114 are different types of USB connections. For example, connection 108 may be a standard A connection and connection 114 may be a standard B connection. Any appropriate connection or connector may be used. In some embodiments, connection 108 and/or 114 is an Ethernet connection.

In a legacy USB connection, power is supplied from the host to the device. For example, if host 100 and device 106 are coupled by a cable, power is supplied from host 100 to device 106. A host may have its own power supply, such as through an AC power adapter. As such, there may be no power supplied to device side wireless adapter 104 via connection 114. Device 106 may not be configured to supply power via connection 114. Device side wireless adapter 104 may include a rechargeable battery that is used as a power supply when a power source is not available (e.g., while coupled to device 106). In some cases a battery can supply power for approximately 10 minutes or 10 GB of exchanged data when fully charged. The following figure illustrates one embodiment of recharging a device side wireless adapter.

Figure 1B:
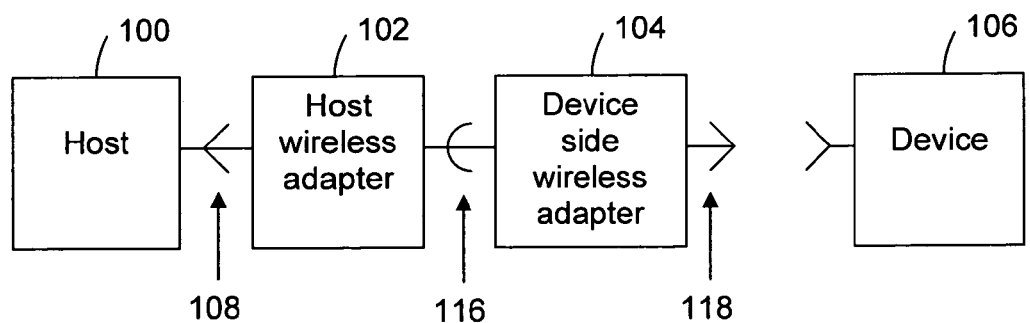
FIG. 1B is a system diagram illustrating an embodiment of recharging a device side wireless adapter.

FIG. 1B is a system diagram illustrating an embodiment of recharging a device side wireless adapter. In the example shown, a battery in device side wireless adapter 104 is charged using host 100 and host side wireless adapter 102. Device side wireless adapter 104 is decoupled from device 106 and is coupled to host side wireless adapter 102. Any appropriate sequence coupling/decoupling components may be used.

In the example shown, host 100 supplies power to host side wireless adapter 102 via connection 108. Via connection 116, power is supplied from host side wireless adapter 102 to device side wireless adapter 104. Host side wireless adapter 102 and device side wireless adapter 104 in the example configuration of FIG. 1B are in a charging mode. In some embodiments, host side wireless adapter 102 is not able to be used to provide a wireless channel while device side wireless adapter 104 is being charged. In a charging mode, a wireless adapter charges its battery and may not necessarily exchange data over a wireless channel. In a transceiving mode, host side wireless adapter 102 and device side wireless adapter 104 may transmit and receive data over a wireless channel. In some embodiments, host side wireless adapter 102 may be used to provide a wireless channel even while device side wireless adapter 104 is being charged. For example, host side wireless adapter 102 may be exchanging data wireless with another device/device wireless adapter pair, or a native wireless device (i.e., with built-in wireless capabilities).

A wireless adapter may determine an appropriate state (e.g., charging, transceiving, etc.) based on connections formed. For example, if no connections are formed, a wireless adapter may be in an idle or a low power state. With no connection formed there may be no external power source and a wireless adapter may wish to conserve its power supply. If connection 116 is formed, host side wireless adapter 102 and device side wireless adapter 104 may be in a charging mode. If connection 116 is not formed and connection 114 is formed, device side wireless adapter 104 may be in a transceiving mode. Similarly, if connection 116 is not formed and connection 108 is formed, host side wireless adapter 102 may be in a transceiving mode. In some embodiments, a wireless adapter determines its state based on another factor such as an input from a user. For example, device wireless adapter 104 may include a switch. A user can select the position of the switch to alternate, for example, between a power down state and a transceiving state.

There may be a variety of conveniences associated with charging device side wireless adapter 104 as shown. For example, a user may not need to carry additional accessories to charge a wireless adapter. A user can use wireless adapters 102 and 104 to wirelessly transfer photographs from a digital camera (e.g., device 106) to a laptop (e.g., host 100) and then recharge wireless adapter 104 without having to carry a cable or an AC power charger.

Connectors 110 and 112 may be a variety of electromechanical interfaces. In this example, connector 110 is a port and connector 112 is a plug. In some embodiments, connector 110 is a plug instead of a port and connector 112 is a port instead of a plug. In some embodiments, connectors 110 and 112 are USB connectors. In some embodiments, a wireless adapter has two types of USB connectors. For example, connector 116 may be a standard B plug and connector 118 may be a mini B plug. This may enable a wireless adapter to be able to operate with a variety of USB connectors. In some embodiments, a USB adapter may be used to convert one type of USB connector to another type. A USB adapter may be removably coupled to a wireless adapter.

In some embodiments, device side wireless adapter 104 may be charged using other methods. For example, a user may have the option of using an AC power charger to charge device side wireless adapter 104. In some embodiments, device side wireless adapter 104 can be charged while it exchanges data wirelessly between host 100 and device 106. This may be useful if a device side wireless adapter is coupled to a device side for a relatively long time. A user may, for example, want to transfer many digital photographs and each digital photograph may be a large file. In some cases, it may be inconvenient to couple and decouple device side wireless adapter 104 to device 106. For example, device 106 may be a printer and it may be inconvenient for a user to form connection 114 when she wants to print. It may therefore be useful to be able to charge a device side wireless adapter using techniques in addition to via a host side wireless adapter. Host side wireless adapter 102 may similarly be charged using a variety of techniques.

In some embodiments, host side wireless adapter 102 and device side wireless adapter are dedicated wireless adapters. A dedicated wireless adapter is configured to support a particular legacy system during a wireless exchange of data. For example, host side wireless adapter 102 may be designed specifically to couple to and interact with legacy hosts or device side wireless adapter 104 may be designed to operate specifically with legacy devices. In some embodiments, a wireless adapter is able to operate with either a host or a device. These types of wireless adapters are referred to as universal wireless adapters, one embodiment of which is described below.

Figure 2A:
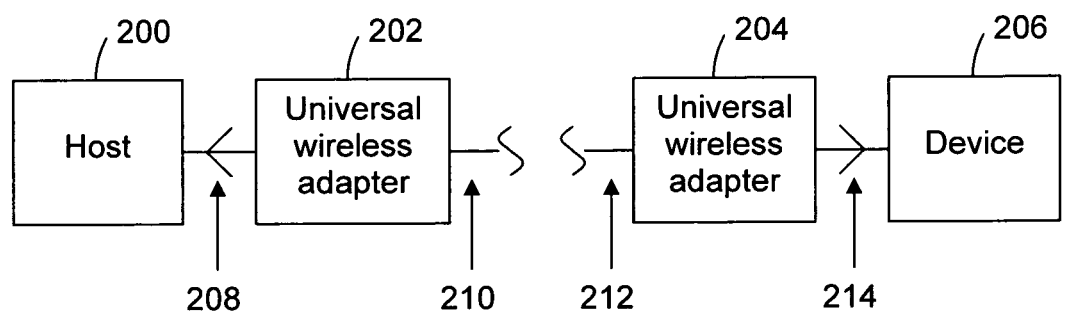
FIG. 2A is a system diagram illustrating an embodiment of using universal wireless adapters to communicate via a wireless channel.

FIG. 2A is a system diagram illustrating an embodiment of using universal wireless adapters to communicate via a wireless channel. In the example shown, the system is similar to that of the FIG. 1A except universal wireless adapters are used. Universal wireless adapters 202 and 204 are used to exchange data over a wireless channel between host 200 and device 206. Host 200 and device 206 are legacy systems and connections 208 and 214 may be USB connections. Universal wireless adapter 202 is coupled to host 200 via connection 208. Universal wireless adapter 202 can be charged via connection 208 by host 200 while exchanging data on the wireless channel. Connection 214 does not supply power to universal wireless adapter 204 and it may use power from a rechargeable battery while exchanging data on a wireless channel.

In some embodiments, a dedicated wireless adapter is used with a universal wireless adapter to exchange data over a wireless channel. For example, universal wireless adapter 202 may be replaced with a dedicated host wireless adapter. Or, a dedicated device wireless adapter may replace universal wireless adapter 204. In some embodiments, host 200 or device 206 is a wireless capable system and a wireless adapter is not needed for that host or that device.

Connectors 210 and 212 may be used to couple universal wireless adapters 202 and 204. This may be convenient since wireless adapters may be used in groups of twos. When not in use, universal wireless adapters 202 and 204 can be coupled together. In some embodiments, connectors 210 and 212 are mechanical interfaces. This may reduce manufacturing costs if an electrical connection is not needed between coupled wireless adapters. In some embodiments, connectors 210 and 212 are electromechanical connectors.

In some scenarios, universal wireless adapters may be preferred over dedicated wireless adapters. For example, electronics retailers may prefer universal wireless adapters since a single product can be stocked. Users may prefer universal wireless adapters since a wireless adapter may be misplaced and replacing a wireless adapter may be more convenient if they are universal wireless adapters. In some scenarios, dedicated wireless adapters may be preferred over universal wireless adapters.

Figure 2B:
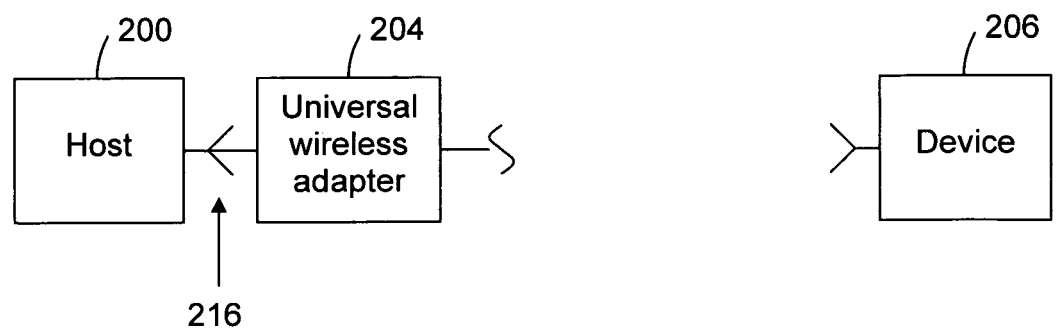
FIG. 2B is a system diagram illustrating an embodiment of recharging a universal wireless adapter.

FIG. 2B is a system diagram illustrating an embodiment of recharging a universal wireless adapter. In the example shown, universal wireless adapter 204 is coupled to device 206. While coupled to device 206, universal wireless adapter 204 is powered by its battery. In some cases, device 206 consumes power via connection 214, further consuming a battery in universal wireless adapter 204. To charge a battery in universal wireless adapter 204, connection 216 can be formed by inserting the plug of universal wireless adapter 204 into the port of host 200. Host 200 supplies power through connection 216 and universal wireless adapter 204 is charged via connection 216. As shown, a host side wireless adapter may be charged by coupling it directly to a host.

These are some examples of charging a wireless adapter. In some embodiments, other techniques are used besides the examples described above. For example, in some embodiments, a wireless adapter is inserted into or otherwise coupled to a cradle. A cradle (and thus the wireless adapter) can be powered by a variety of sources, such as an AC outlet and/or from a host (e.g., the power supplied by a computer's USB connection). In some embodiments, a cradle is configured to have multiple power adapters or connections so that a user is able to select a power supply based on available power supplies. If, for example, a user is traveling and there is no AC power supply, a user may opt to power the cradle (and a coupled wireless adapter) using the power supply from the USB connection of their laptop. If there is an AC power supply available, the user may opt to power a cradle using the AC power supply.

Figure 3A:
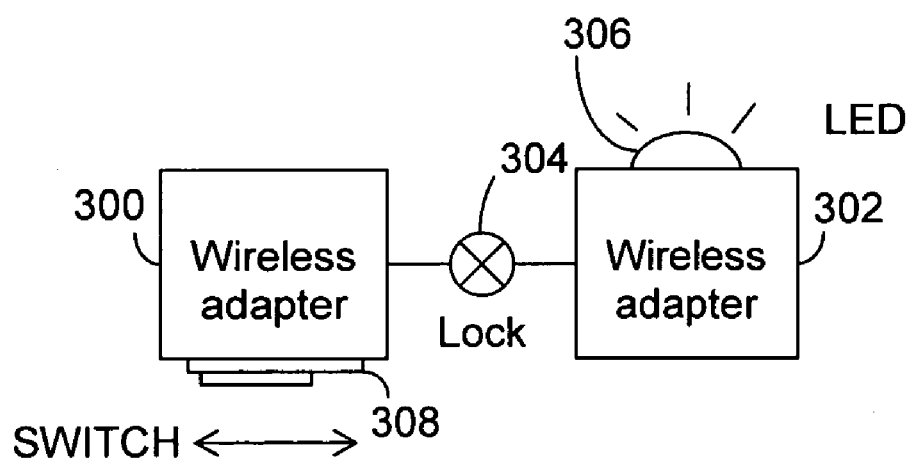
FIG. 3A is a system diagram illustrating an embodiment of a pair of wireless adapters.

FIG. 3A is a system diagram illustrating an embodiment of a pair of wireless adapters. In the example shown, wireless adapters 300 and 302 may be coupled together when not in use. Wireless adapters 300 and 302 may both be dedicated wireless adapters, universal wireless adapters, or some combination of dedicated/universal wireless adapters.

In the example shown, lock 304 is used to prevent wireless adapters 300 and 302 from being decoupled and being misplaced. For example, wireless adapters 300 and 302 may be removably coupled to each other. A user may couple and uncouple the adapters to each other any number of times, for example using connectors 210 and 212 or connectors 110 and 112. While coupled together, a user can activate lock 304 so that wireless adapters 300 and 302 cannot be decoupled without disabling lock 304. Lock 304 may include a variety of devices including a hook, a tie, a fastener, a catch, or a spring loaded component. An action associated with locking/unlocking lock 304 may be a different action than an action associated with coupling wireless adapters 300 and 302. For example, wireless adapters 300 and 302 may be coupled by inserting a circular plug into a circular port. Lock 304 may be activated by twisting one or both of the wireless adapters while coupled together. In some embodiments, locks may be used in a daisy chain fashion. For example, a connection may be formed and locked between wireless adapter 302 and a third wireless adapter. In some embodiments, a wireless adapter does not include a lock.

Wireless adapter 302 includes Light Emitting Diode (LED) 306. LED 306 may be used to indicate a variety of modes, states, or events to a user. LED 306 may use a variety of blinking rates, duty cycles, or colors so that multiple indications may be conveyed to a user. In some embodiments, an LED indicates when a wireless adapter has detected a counterpart wireless adapter. In some embodiments, an LED is used to indicate when data is being exchanged over a wireless channel. For example, LED 306 may flash when transmitting to or receiving a signal over the wireless channel. In some cases it is possible to distinguish between transmitting and receiving (e.g., using different colors or blink rates). In some embodiments, LED 306 indicates the power level of a rechargeable battery in a wireless adapter. For example, LED 306 may be green when a battery has completed charging.

LED 306 may be red when the battery level is critical or below a threshold. In some embodiments, a wireless adapter does not include an LED.

Wireless adapter 300 includes switch 308. Switch 308 may be used by a user to select a state associated with wireless adapter 300. For example, universal wireless adapter 204 may include a switch. One position of the switch may be associated with a transceiving mode (e.g., the configuration of FIG. 2A) and the other position may be associated with a charging mode (e.g., the configuration of FIG. 2B). A user may set the position of the switch at appropriate times. In a charging mode, a transceiver in a wireless adapter can be powered down to conserve power. In some embodiments, a wireless adapter may be used as a storage device. For example, a wireless adapter may include a flash memory. A user may create a USB connection between a host and a wireless adapter, and a user store or retrieve documents, digital photographs, songs, or other files in memory. Although switch 308 is shown in this example as a two position switch, a switch may have three or more positions. In some embodiments, switch 308 may include one or more buttons (e.g., to toggle or select a state), a dial, etc. In some embodiments, a wireless adapter does not include a switch.

In some embodiments, wireless adapters 300 and 302 are in a lower power or powered down state when coupled together as illustrated. That is, wireless adapters 300 and 302 do not necessarily consume power (e.g., from rechargeable batteries included in wireless adapters 300 and 302) until the wireless adapters are decoupled from each other. Separating wireless adapters 300 and 302 acts as a power-on switch. This may conserve power when the wireless adapters are not inserted or otherwise coupled to a host or device. In some embodiments, one of the wireless adapters is host wireless adapter and the other is a device wireless adapter. In some embodiments, a host wireless adapter is always powered on (e.g., even when coupled to a device wireless adapter) but the device wireless adapter to which it is coupled is not powered up until the wireless adapters are separated.

Figure 3B:
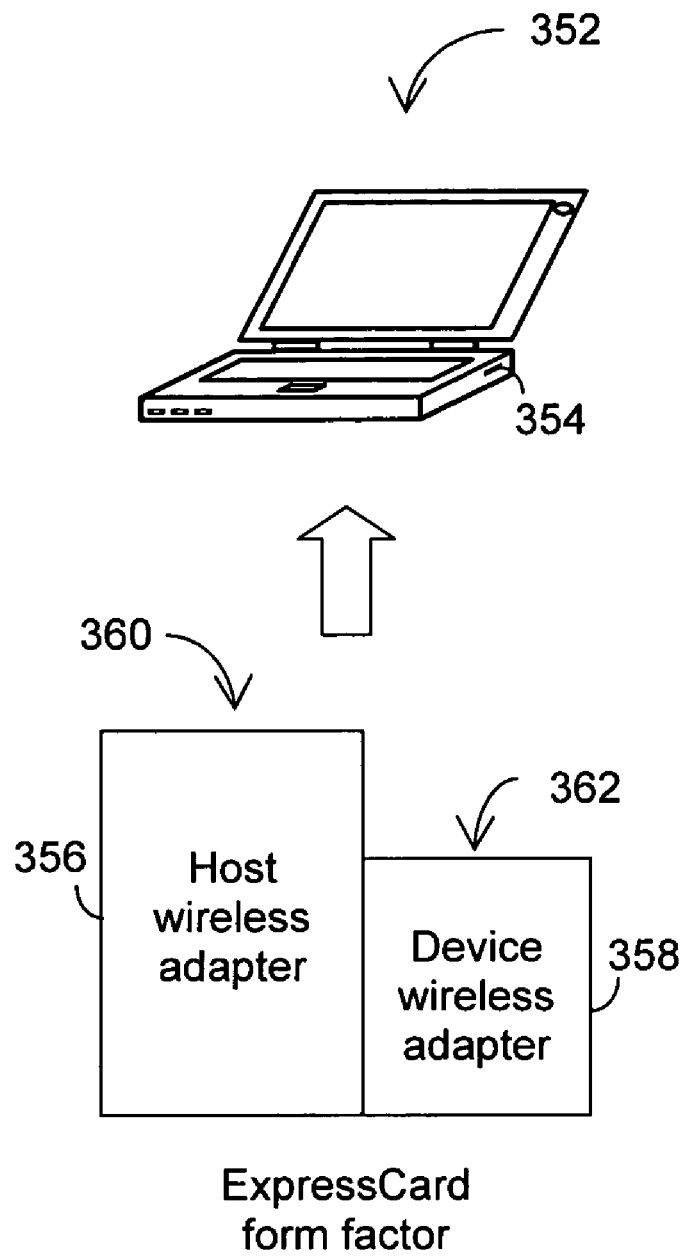
FIG. 3B is a diagram illustrating an embodiment of wireless adapter that are charged using ExpressCard.

FIG. 3B is a diagram illustrating an embodiment of wireless adapter that are charged using ExpressCard. In the example shown, component 356 is a host side wireless adapter and component 358 is a device side wireless adapter. Wireless adapter 358 does not receive a power supply while coupled to its respective device that does not have built-in wireless capabilities. To charge wireless adapter 358, wireless adapters 356 and 358 are coupled together and a battery in wireless adapter 358 is charged using ExpressCard.

To use wireless adapters 356 and 358, wireless adapters 356 and 358 are decoupled from each other. For example, wireless adapter 356 is removably coupled to a host, and wireless transceiver 358 is removably coupled to a device where the host and device do not have built-in wireless capabilities. Using the wireless adapters, information is exchanged wirelessly between the host and device. In some embodiments, wireless adapter 358 includes a USB connector. For example, in some embodiments wireless adapter 358 is inserted into the USB port of a device to provide wireless capabilities to the device. In some embodiments, wireless transceiver 356 is inserted into an ExpressCard slot of laptop 352 (or other host) to provide wireless capabilities to the laptop.

The ExpressCard standard was developed by the Personal Computer Memory Card International Association (PCMCIA). There are two form factors (i.e., shapes) specified by the ExpressCard standard: ExpressCard/34 and ExpressCard/54. The ExpressCard/34 form factor is a rectangular shape and the ExpressCard/54 form factor is an "L" shape. In either form factor, pins that provide an electrical connection (e.g., to laptop 352) are located along surface 360. There are no pins located along surface 362.

To charge wireless adapter 358, wireless adapters 356 and 358 are coupled together (as shown in this figure) so that they are in an ExpressCard/54 form factor. Coupled wireless adapters 356 and 358 are inserted into a slot of a system configured to support the ExpressCard/54 form factor. For example, coupled wireless adapters 356 and 358 are inserted into ExpressCard slot 354 of laptop 352. Wireless adapters 356 and 358 have an electrical connection via which power is supplied to wireless adapter 358 and the battery in it is charged. Data is not necessarily exchanged between wireless adapters 356 and 358 when wireless adapter 358 is being charged. In some embodiments, a system other than a laptop may be used to charge wireless adapter 358. Any device that is configured to support the ExpressCard standard and the ExpressCard/54 form factor may be used to charge wireless transceiver 358. In some embodiments, wireless adapters 356 and 358 exchange encryption key data between themselves when coupled. For example, in some applications wireless adapters 356 and 358 use encryption key data during an initial association between two.

In some embodiments, wireless adapter 356 is able to provide wireless channel for a host even when wireless adapter 358 is coupled to it and/or is being charged. For example, in some embodiments, there is no difference in the signaling (e.g., via pins along surface 360) between wireless transceiver 356 and a host to which it is coupled when wireless adapter 358 is coupled to wireless adapter 356 or not.

In some embodiments, the example form factors and couplings/interfaces that are supported by wireless adapters 356 and 358 enable convenient storage. For example, when wireless adapter 358 is not being used and/or is being charged, wireless adapters 356 and 358 can be inserted and stored in laptop 352. Wireless adapters in other shapes (e.g., USB dongles) may become misplaced when not in use and/or when being charged. In some embodiments, a substantial portion of wireless adapters 356 and 358 are encompassed in laptop 352 when they are inserted into slot 354. In some embodiments, only an inch or so of wireless adapters 356 and/or 358 is/are exposed when inserted into slot 354. For example, in some embodiments, only the antenna or some other part of a wireless transceiver is exposed when inserted into slot 354. The ExpressCard standard specifies mechanical connections to hold inserted cards in place, and a spring loaded mechanism may be used to remove a card that is inserted into an ExpressCard slot. Wireless adapters that are configured to be charged and/or stored using ExpressCard may be less likely to be lost.

In some applications, laptop 352 is a native wireless host that has built-in wireless capabilities. In some embodiments, a wireless adapter that is configured to be stored or otherwise inserted into slot 354 is a device wireless adapter. That is, in some application it may not be necessary to have possession of a host wireless adapter (e.g., if laptop 352 is a native wireless host). A device wireless adapter in such applications can be in either an ExpressCard/54 form factor or an ExpressCard/34 form factor. This device wireless adapter can be ejected from laptop 354 and plugged into device peripherals.

In some embodiments, another advantage to the wireless adapters shown is a higher bandwidth or data rate that is able to be supported using ExpressCard. For example, ExpressCard supports PCI Express and USB 2.0 connections and data rates of up to 2.5 Gbps and 480 Mbps, respectively. Wireless adapter 356 (which uses ExpressCard) may therefore be able to support higher data rate communication with its host compare to other wireless adapters (e.g., a wireless adapter that communicate with a host via a USB type A connection).

As shown in this figure, the shape of a wireless adapter and/or the interface or connection by which it is charged and/or supports a wireless channel varies in various embodiments. In some embodiments, other standards or specifications such as PCMCIA or CardBus are used.

Figure 4:
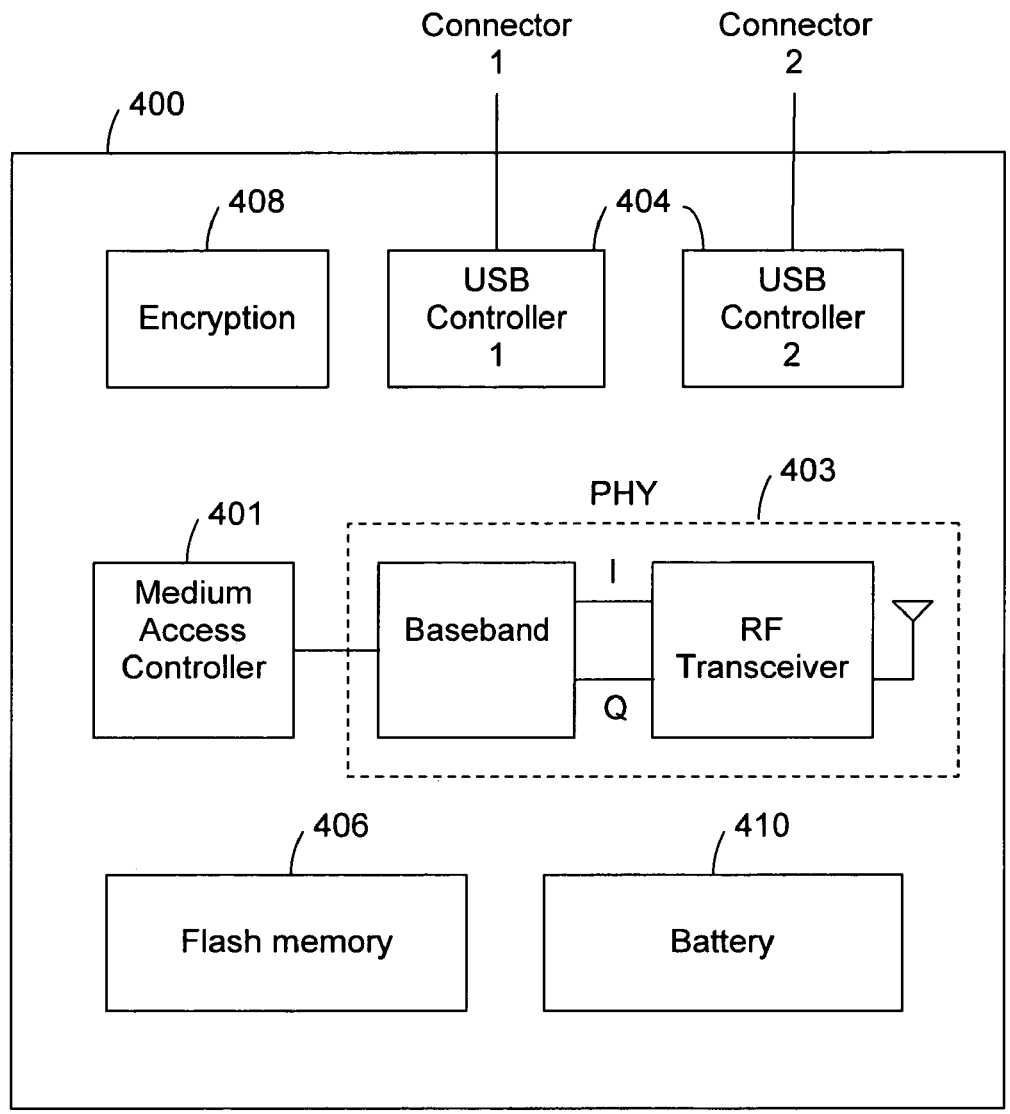
FIG. 4 is a block diagram illustrating an embodiment of a wireless adapter.

FIG. 4 is a block diagram illustrating an embodiment of a wireless adapter. In the example shown, wireless adapter 400 is configured to couple to a legacy system to support communication over a wireless channel. Wireless adapter 400 may be a universal wireless adapter or a dedicated wireless adapter. Medium Access Controller 401 and PHY 403 are used to transmit and receive signals on a wireless channel. In this example, Medium Access Controller 401 and PHY 403 are associated with Ultra Wideband (UWB). For example, Medium Access Controller 401 and PHY 403 in some applications are configured to support the WiMedia UWB specification. UWB systems use bands with relatively large bandwidths. A UWB system may use a band with a bandwidth, for example, on the order of hundreds of MHz, whereas a narrowband system may use a band with bandwidth on the order of tens of MHz. Some example UWB systems are WiMedia UWB systems and IEEE 802.15 UWB systems.

USB Controllers 404 control the other components in wireless adapter 400. When exchanging data over a wireless channel, transmit data may be passed from one of the connectors to its corresponding USB controller 404. A USB controller in turn passes the transmit data to encryption block 408 for encryption. The encrypted data is passed back to the appropriate USB controller 404, which in turn passes the encrypted data to Medium Access Controller 401, which in turn passes data to transmit to PHY 403. PHY 403 transmits the data on a wireless channel. When receiving, the reverse path is followed.

One or both of the connectors may be USB connectors via which a connection to a legacy device may be formed. In this example, wireless adapter 400 has two connectors. In some embodiments, a wireless adapter has a single connector. In some embodiments, a wireless adapter has three or more connectors.

Flash memory 406 includes non-volatile storage used when wireless adapter 400 is used as a USB flash device. A USB flash device is a portable storage device that can be connected to the USB port of a host such as a computer. A user of the computer can read from, write to, modify, and/or delete files stored on a USB flash device. When operating as a USB flash device, power may be supplied by a host via a USB connection. In some embodiments it is possible to charge battery 410 when used as a USB flash device. In some embodiments, wireless adapter 400 may be in a transceiving mode or in a storage device mode. In a transceiving mode, flash memory 406 may be used by one or more components of wireless adapter 400. For example, encryption block 408 may store intermediate values in flash memory 406 when encrypting or decrypting data. USB controller 404 may use flash memory 406 as a buffer to regulate the flow of data passed to or from a connector or Medium Access Controller 401. Data stored on flash memory 406 during a transceiving mode may be stored temporarily and may be removed when a wireless adapter enters another mode.

Encryption block 408 is used to encrypt and decrypt information. For example, wireless adapter 400 and a counterpart wireless adapter may use the same encryption key to encrypt and decrypt data exchanged over the wireless channel. A variety of techniques may be used to obtain an encryption key.

Battery 410 is used to power wireless adapter 400. Power may be consumed from battery 410 when wireless adapter 400 is in a transceiving mode and is coupled to a legacy device system, such as a camera or printer. When coupled to a host system (legacy or otherwise), wireless adapter 400 may receive power from the host and battery 410 may not be used. Battery 410 may be charged while coupled to a host directly or via an intermediary system such as another wireless adapter.

To conserve power when coupled to a device, wireless adapter 400 may power down one or more components. For example, encryption block 408 may be powered down until data is ready to be encrypted or decrypted. USB controller 404 may be powered down. In a USB system, communication may be initiated by a host. Data received on a wireless channel may be processed to determine when data is from a host system. Until data from a host is received, some or all of USB controller 404 may be powered down. In some embodiments, transceiver 402 powers down and wakes up on a periodic basis to check for traffic on the wireless channel.

Figure 5:
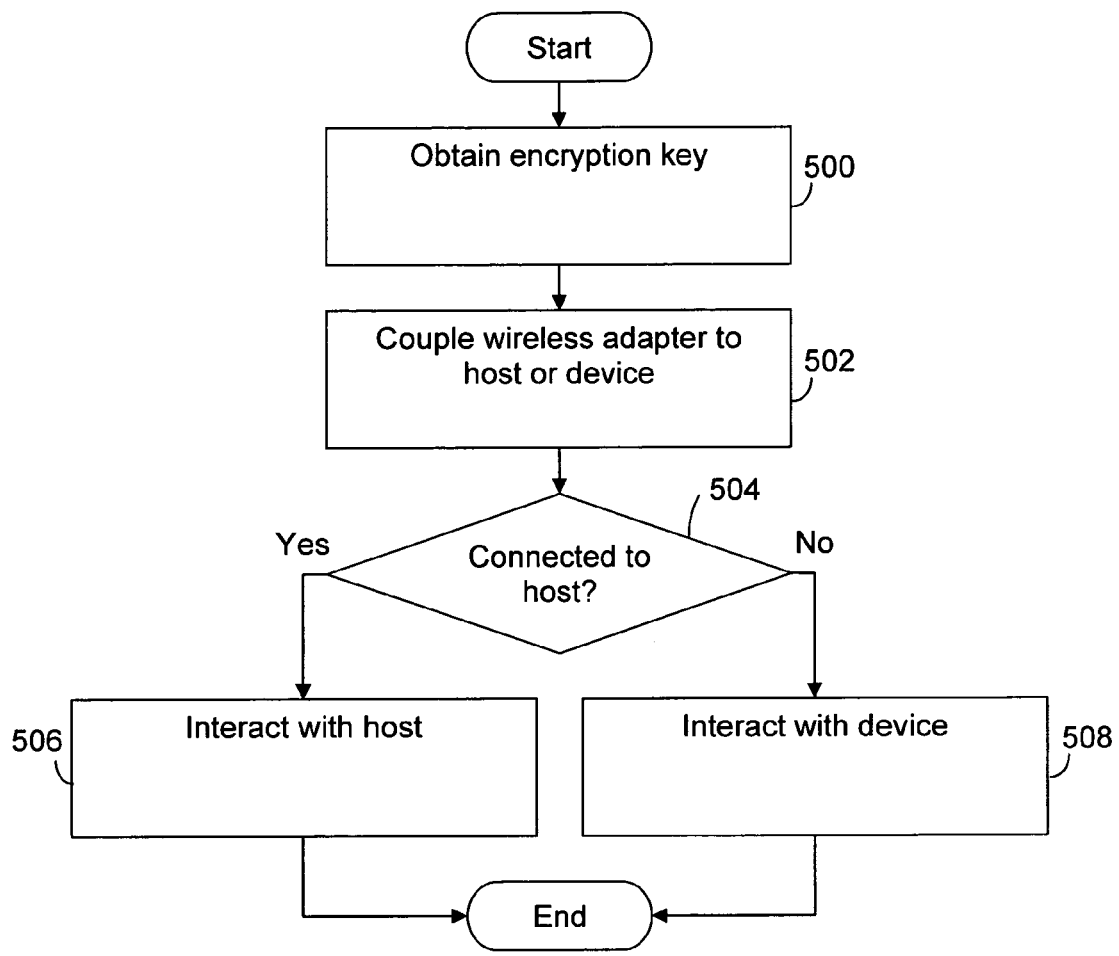
FIG. 5 is a flowchart illustrating an embodiment of a process for exchanging data over a wireless connection using a wireless adapter.

FIG. 5 is a flowchart illustrating an embodiment of a process for exchanging data over a wireless connection using a wireless adapter. In the example shown, a wireless adapter is initially coupled to another wireless adapter referred to as a counterpart wireless adapter. At 500, an encryption key is obtained. An embodiment for obtaining an encryption key is described in further detail below. In some embodiments, coupling wireless adapters together triggers an encryption key exchange. That is, each time two wireless adapters are coupled together, they obtain a new encryption key. The encryption key is subsequently used to encrypt and decrypt data exchanged over a wireless channel with the counterpart wireless adapter. Any appropriate technique to obtain an encryption key may be used.

At 502, the wireless adapter is coupled to a host or a device. For example, the wireless adapter is decoupled from its counterpart wireless adapter and a coupled to a device or a host. A variety of interfaces and/or connections may be used, such as USB or ExpressCard. It is determined at 504 whether a wireless adapter is connected to host. If a wireless adapter is connected to a host, at 506 the wireless adapter interacts with the host. For example, data may be obtained from or sent to a device system over a wireless channel. While coupled to a host, a wireless adapter may charge its battery. If a wireless adapter is connected to a device, at 508 the wireless adapter interacts with the device. Data may be transmitted to or received from a device via a device side wireless adapter. In some embodiments, while interacting with a device at 508 a rechargeable battery included in the wireless adapter is used to power the wireless adapter. To charge the battery, in some embodiments, a wireless adapter is decoupled to a device system and is charged using another wireless adapter and/or a host system (e.g., a computer).

In some embodiments, wireless adapters are designed to operate in a lower power state when interacting with a device system at 508. The example process described may be modified accordingly to achieve this. In some embodiments, wireless adapters are designed so a host side wireless adapter has more processing burden or functionality compared to a device side wireless adapter. This may reduce power consumption at the device side wireless adapter. In some embodiments, a portion of a device side wireless adapter is powered down (e.g., on a periodic or event driven basis). One or more unused components may be powered down to conserve power when interacting with a device system. In some embodiments, other power conservation techniques are used.

Figure 6:
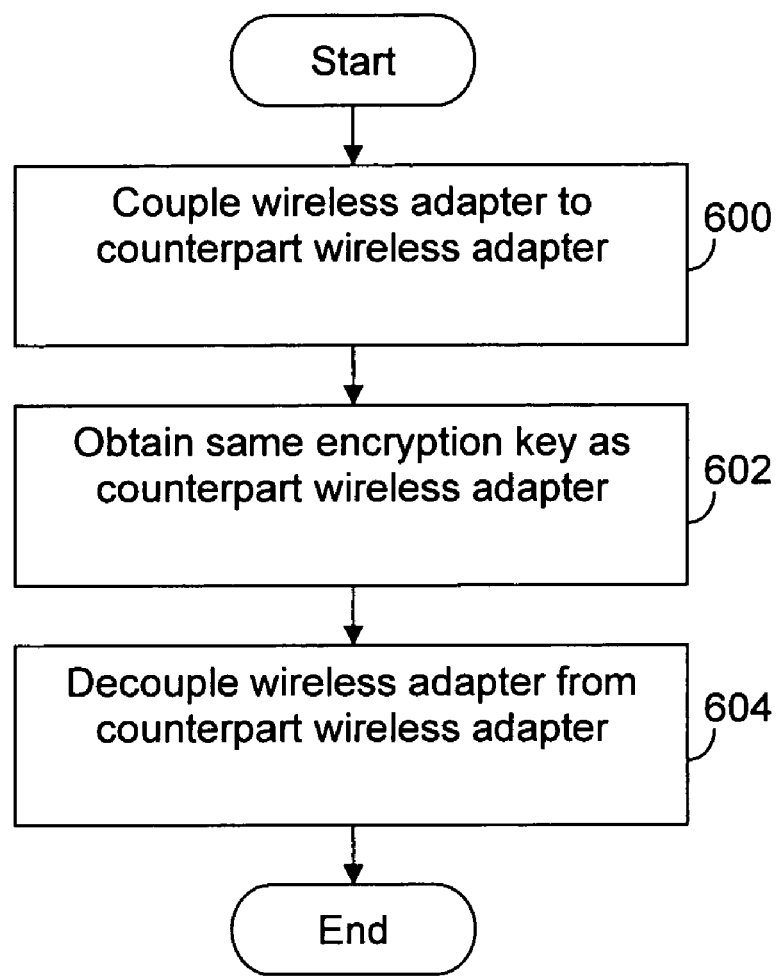
FIG. 6 is a flowchart illustrating an embodiment of obtaining an encryption key.

FIG. 6 is a flowchart illustrating an embodiment of obtaining an encryption key. In the example shown, the process may be used at 500 to obtain an encryption key. At 600, a wireless adapter is coupled to a counterpart wireless adapter. For example, wireless adapters 102 and 104 may be coupled using connectors 110 and 112 or wireless adapters 202 and 204 may be coupled using connectors 210 and 212. Any appropriate connection and connectors may be used.

At 602, the same encryption key is obtained as a counterpart wireless adapter. In some embodiments, one wireless adapter generates an encryption key and passes it to the other wireless adapter. In some embodiments, the wireless adapters are dedicated wireless adapters, and the host side wireless adapter is responsible for generating an encryption key, since this process may consume power and the host side wireless adapter will be recharged when subsequently coupled to a host system. In some embodiments, the coupled wireless adapters interact to mutually generate an encryption key. For example, a Diffie-Hellman key exchange may be used where coupled wireless adapters exchange information and each generates the same encryption key. Although a Diffie-Hellman key exchange is often performed over an insecure wireless channel, the information can be exchanged using an electrical connection between the coupled wireless adapters. Other appropriate techniques besides a Diffie-Hellman key exchange may be used to obtain an encryption key.

Once obtained, an encryption key may be stored in nonvolatile memory. For example, if encryption block 408 performs the process described, the encryption key may be stored for future use in memory 406 even if encryption block 408 is not powered. This may occur, for example, if encryption block 408 is powered down to conserve power or if battery 410 runs out of power.

A wireless adapter is decoupled from a counterpart wireless adapter at 604. Once decoupled, one wireless adapter may be coupled to a legacy host system and the other wireless adapter may be coupled to a legacy device system. The encryption key shared by the wireless adapters may be used to encrypt and decrypt data exchanged over a wireless channel between the two adapters.

There may be some advantages to obtaining an encryption key as described. For example, since the encryption key is obtained over a wired channel, the likelihood of a third party intercepting the encryption key may be reduced. Less process intensive techniques may be used to obtain an encryption key, which may reduce the cost and/or power consumption of a wireless adapter. Although a more process intensive technique may be used to obtain the encryption key, such techniques may not be necessary since the encryption key is obtained while the wireless adapters are coupled.

Wireless adapters that obtain their encryption key while coupled may also be convenient because they are paired together and will search for a specific wireless adapter. This may be useful if there are many wireless adapters in use. A pairing may last until a new pairing is created using one or both of the wireless adapters. Paired wireless adapters do not necessarily need to be sold together nor do they need to be manufactured by the same manufacturer. Two wireless adapters purchased at different times from different manufacturers may be coupled together and paired.

In some embodiments, an encryption key is obtained using a different technique that than described above. For example, wireless adapters may obtain an encryption key over a wireless channel using a Diffie-Hellman key exchange. Obtaining an encryption key in some embodiments is triggered by a user. For example, a user can put both wireless adapters into a mode where they obtain an encryption key. A user may press a button, put a switch in an appropriate position, or perform any other appropriate interaction to put a wireless adapter in such a mode.

Figure 7:
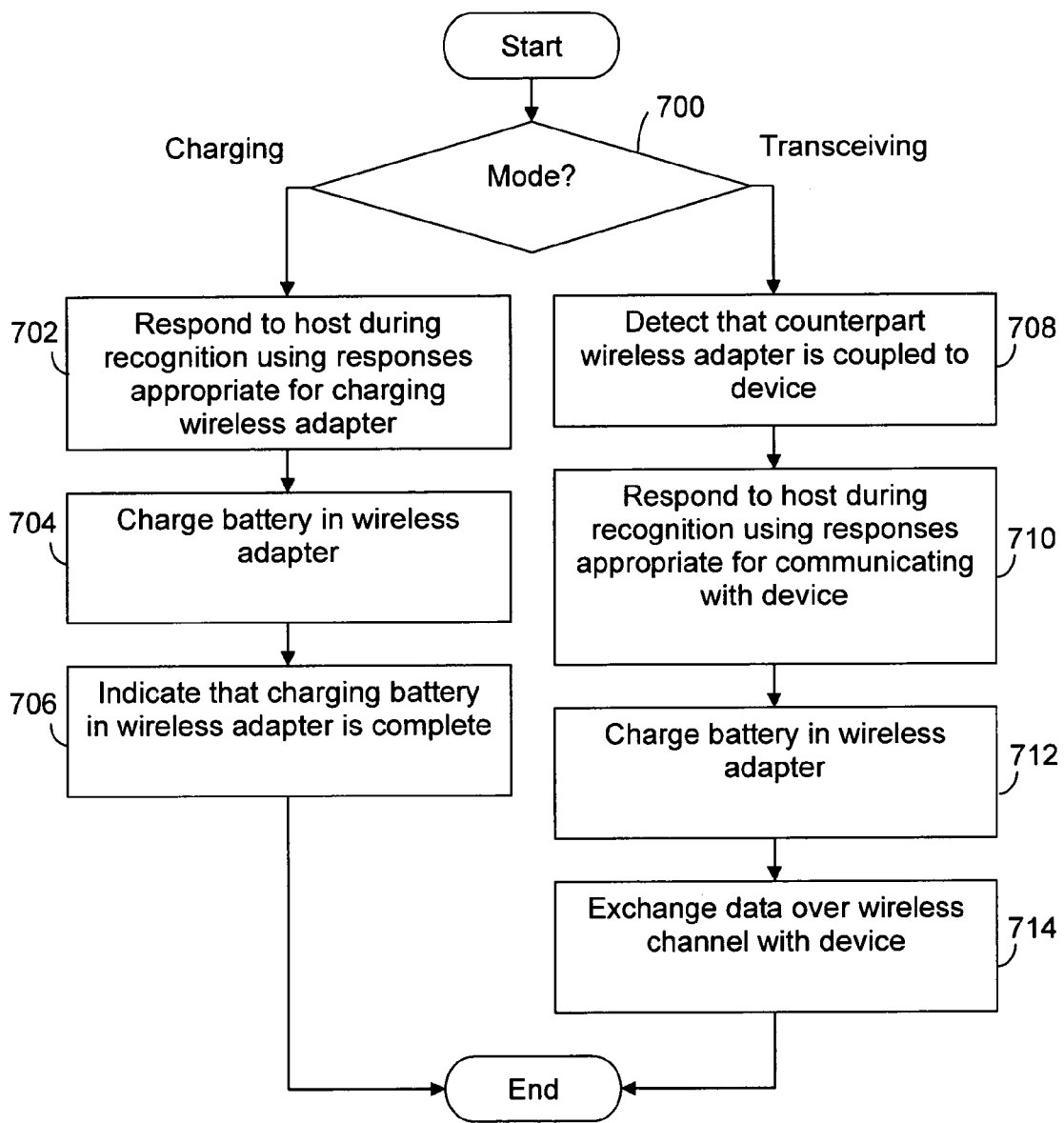
FIG. 7 is a flowchart illustrating an embodiment of process of a wireless adapter interacting with a host.

FIG. 7 is a flowchart illustrating an embodiment of process of a wireless adapter interacting with a host. In the example shown, the illustrated process may be used to interact with a host at 506 to charge a battery and/or exchange data over a wireless channel. It is determined at 700 what mode a wireless adapter is in. If a wireless adapter is in a charging mode, at 702 it responds to a host during recognition using responses appropriate for charging a wireless adapter. For example, a host system may enumerate a wireless adapter and attempt to determine a device class that the wireless adapter belongs to. A wireless adapter may respond in a manner sufficient to receive power through a USB connection from a host. At 704 a battery in a wireless adapter is charged. At 706, it is indicated that charging a battery in the wireless adapter is complete. For example, an LED may turn on or display a particular color once charging is complete.

If a wireless adapter is in a transceiving mode, at 708 it is detected that a counterpart wireless adapter is coupled to device. A host side wireless adapter may do this by periodically transmitting a signal on the wireless channel. A device side wireless adapter may respond on the wireless channel once it is coupled to a legacy device. To differentiate between other wireless adapters, an encryption key, identifier (e.g., a MAC address), or other information may be used to identify a counterpart wireless adapter. At 710, a wireless adapter responds to a host during recognition using responses appropriate for communicating with a device. In some embodiments, a host system to which a wireless adapter is coupled includes firmware, drivers, or other software that are configured to exchange data over wireless connection. For example, such software may be aware that the wireless channel is a shared medium and that error rates are high compared to a wired channel. Response times expected by firmware or a driver may account for the lossy nature of a wireless channel.

A battery in a wireless adapter is charged at 712. In some embodiments, an indication is provided to a user regarding the power level of a battery. For example, in some embodiments an LED is on during when the power level of a batter is low, or if multiple colors are used, one color indicates a satisfactory battery level and another indicates a low battery level. Data is exchanged over a wireless channel with a device at 714. For example, when transmitting data, data may be passed from the host to a host side wireless adapter. The host side wireless adapter may transmit a signal on the wireless channel. A device side wireless adapter may receive a signal on the wireless channel and pass received data to the device system. To exchange data in the other direction, the reverse path may be used. In some embodiments, data exchanged on a wireless channel is encrypted.

In some embodiments, wireless adapters periodically "ping" each other over a wireless channel to determine that their connections to their respective systems are still intact. A wireless adapter may not have sufficient time to notify its counterpart wireless adapter when a user breaks a connection between that wireless adapter and its respective system. To conserve power at the device side wireless adapter, pings may be initiated by a host side wireless adapter. If a host side wireless adapter does not receive a response to its ping for a certain amount of time, it may conclude that the connection between the device and the device side wireless adapter has been broken. If a device side wireless adapter does not receive a ping for a certain amount of time, it may conclude that the host side wireless adapter has been decoupled from the host system.

Figure 8:
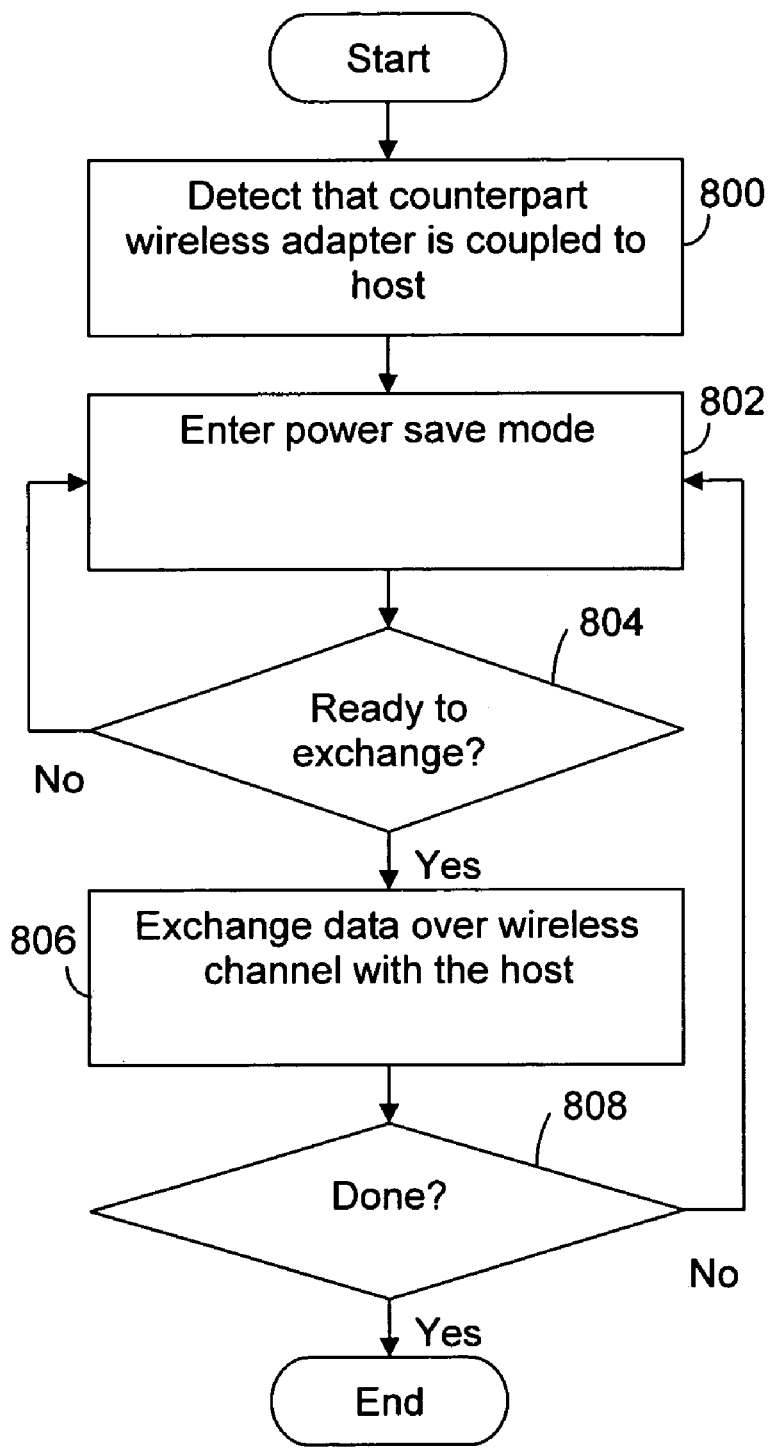
FIG. 8 is a flowchart illustrating an embodiment of process of a wireless adapter interacting with a device.

FIG. 8 is a flowchart illustrating an embodiment of process of a wireless adapter interacting with a device. In the example shown, the illustrated process may be used to interact with a device at 508. At 800, a wireless adapter detects that a counterpart wireless adapter is coupled to a host. For example, a device side wireless adapter may receive a signal from a host side wireless adapter on a wireless channel and respond on the wireless channel. At 802, a power save mode is entered. During a power save mode, some modules or blocks of a wireless adapter are powered down. For example, a host may initiate communication with a device, and some portion of a device side wireless adapter may be powered down until the host side initiates some communication.

It is determined at 804 if data is ready to be exchanged. In some applications, all communications are initiated by the host rather than the device. In such applications, a transceiver in a device side wireless adapter may operate so that a communication from the host side can be detected on the wireless channel. For example, the transceiver listens on the wireless channel and determines when the host side is attempting to communicate with the device side. In some embodiments, a transceiver generates a wakeup signal and asserts this signal when a communication from the host side is detected. If an exchange is not ready, a wireless adapter remains in a power save mode at 802. Otherwise, data is exchanged over a wireless channel with the host at 806. At 808 it is determined if the process is done. If the process is not, power save mode is entered at 802.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of charging including:
  forming a first electrical connection directly between a first wireless adapter having a battery and a second wireless adapter without an intermediary device, wherein:
    the first wireless adapter and the second wireless adapter are configured to provide wireless communications capability for a legacy device that does not have wireless communication capabilities and a host that does not have wireless communication capabilities by coupling, respectively, to the legacy device and the host and exchanging data on a wireless channel on behalf of the legacy device or the host to which the first wireless adapter or the second wireless adapter is respectively coupled during a data exchange mode; and
    the first wireless adapter is configured to be able to be removably coupled to the legacy device to provide the wireless channel between the device and the host;
  forming a second electrical connection directly between the second wireless adapter and the host without an intermediary device; and
  charging the battery of the first wireless adapter via the second wireless adapter using the host.

2. A method as recited in claim 1, wherein the wireless channel is associated with Ultra Wideband (UWB).

3. A method as recited in claim 1, wherein the wireless channel is associated with a WiMedia specification.

4. A method as recited in claim 1, wherein charging the battery includes using Universal Serial Bus (USB).

5. A method as recited in claim 1, wherein charging the battery includes using ExpressCard.

6. A method as recited in claim 1, wherein the wireless adapter includes a memory.

7. A method as recited in claim 1 further comprising indicating that charging the battery has completed.

8. A method as recited in claim 1, wherein forming the second electrical connection includes removably coupling the second wireless adapter to the host.

9. A method as recited in claim 1 further comprising obtaining an encryption key while the first wireless adapter and the second wireless adapter are removably coupled.

10. A method as recited in claim 1 further comprising determining whether the first wireless adapter is in a charging mode, wherein charging occurs in the event the first wireless adapter is in a charging mode.

11. A method as recited in claim 1 further comprising:
  breaking the first electrical connection between the first wireless adapter and the second wireless adapter;
  removably coupling the first wireless adapter to the legacy device; and
  wirelessly exchanging data between the legacy device and the host using the first wireless adapter.

12. A method as recited in claim 1 further comprising:
  breaking the first electrical connection between the first wireless adapter and the second wireless adapter;
  removably coupling the first wireless adapter to the legacy device;
  removably coupling the second wireless adapter to the host; and
  wirelessly exchanging data between the device and the host using the first wireless adapter and the second wireless adapter.

13. A method as recited in claim 1 further comprising:
  breaking the first electrical connection between the first wireless adapter and the second wireless adapter;
  removably coupling the first wireless adapter to the legacy device; and
  wirelessly exchanging data between the legacy device and the host using the first wireless adapter, wherein the first wireless adapter is in a power save mode for a non-zero period of time when not wirelessly exchanging data.

14. A method as recited in claim 1, wherein:
  while the first wireless adapter is coupled to the second wireless adapter, the first wireless adapter is in a lower power state.

15. A system for charging including:
  a first connector configured to form a first electrical connection directly between a first wireless adapter having a battery and a second wireless adapter without an intermediary device, wherein:
    the first wireless adapter and the second wireless adapter are configured to provide wireless communications capability for a legacy device that does not have wireless communication capabilities and a host that does not have wireless communication capabilities by coupling, respectively, to the legacy device and the host and exchanging data on a wireless channel on behalf of the legacy device or the host to which the first wireless adapter or the second wireless adapter is respectively coupled during a data exchange mode; and
    the first wireless adapter is configured to be able to be removably coupled to the legacy device to provide the wireless channel between the device and the host;
  a second connector configured to form a second electrical connection directly between the second wireless adapter and the host without an intermediary device; and
  a battery charger configured to charge the battery of the first wireless adapter via the second wireless adapter using the host.

16. A system as recited in claim 15, wherein the battery charger is configured to charge the battery using Universal Serial Bus (USB).

17. A system as recited in claim 15, wherein the battery charger is configured to charge the battery includes using ExpressCard.

18. A system as recited in claim 15 further comprising a processor configured to obtain an encryption key while the first wireless adapter and the second wireless adapter are removably coupled.

19. A computer program product for charging, the computer program product being embodied in a computer readable medium and comprising computer instruction for:
   forming a first electrical connection directly between a first wireless adapter having a battery and a second wireless adapter without an intermediary device, wherein:
      the first wireless adapter and the second wireless adapter are configured to provide wireless communications capability for a legacy device that does not have wireless communication capabilities and a host that does not have wireless communication capabilities by coupling, respectively, to the legacy device and the host and exchanging data on a wireless channel on behalf of the legacy device or the host to which the first wireless adapter or the second wireless adapter is respectively coupled during a data exchange mode; and
      the first wireless adapter is configured to be able to be removably coupled to the legacy device to provide the wireless channel between the device and the host;
   forming a second electrical connection directly between the second wireless adapter and the host without an intermediary device; and
   charging the battery of the first wireless adapter via the second wireless adapter using the host.

20. A computer program product as recited in claim 19, wherein the computer instructions for charging the battery include computer instructions for using Universal Serial Bus (USB).

21. A computer program product as recited in claim 19, wherein the computer instructions for charging the battery include computer instructions for using ExpressCard.

22. A computer program product as recited in claim 19, the computer program product further comprising computer instructions for obtaining an encryption key while the first wireless adapter and the second wireless adapter are removably coupled.

23. A computer program product as recited in claim 19, the computer program product further comprising computer instructions for:
   breaking first the electrical connection between the first wireless adapter and the second wireless adapter;
   removably coupling the first wireless adapter to the legacy device; and
   wirelessly exchanging data between the legacy device and the host using the first wireless adapter.

* * * * *